US009261699B2

(12) United States Patent
Ouchi et al.

(10) Patent No.: US 9,261,699 B2
(45) Date of Patent: Feb. 16, 2016

(54) MICROSCOPE APPARATUS AND STORAGE MEDIUM STORING MICROSCOPE APPARATUS CONTROL PROGRAM

(75) Inventors: Yumiko Ouchi, Yokohama (JP); Takashi Kawahito, Fujisawa (JP)

(73) Assignee: NIKON CORPORATION, Tokyo (JP)

( * ) Notice: Subject to any disclaimer, the term of this patent is extended or adjusted under 35 U.S.C. 154(b) by 554 days.

(21) Appl. No.: 12/926,928

(22) Filed: Dec. 17, 2010

(65) Prior Publication Data
US 2011/0141260 A1 Jun. 16, 2011

Related U.S. Application Data

(63) Continuation of application No. PCT/JP2009/002296, filed on May 25, 2009.

(30) Foreign Application Priority Data

Jun. 17, 2008 (JP) .................................. 2008-158033

(51) Int. Cl.
G02B 21/00 (2006.01)
G02B 27/00 (2006.01)
G02B 7/00 (2006.01)
G02B 21/16 (2006.01)

(52) U.S. Cl.
CPC ............ G02B 27/0068 (2013.01); G02B 7/008 (2013.01); G02B 21/16 (2013.01); G02B 2207/113 (2013.01)

(58) Field of Classification Search
None
See application file for complete search history.

(56) References Cited

U.S. PATENT DOCUMENTS 6,473,228 B1 * 10/2002 Toshimitsu .................... 359/368
2007/0279586 A1 * 12/2007 Jethmalani et al. ........... 351/164
2008/0158664 A1 * 7/2008 Teich et al. .................... 359/363

FOREIGN PATENT DOCUMENTS

| JP | 2005-31507 | | 2/2005 |
| JP | 2005031507 A | * | 2/2005 |
| JP | 2005-292538 | | 10/2005 |
| JP | 2005292538 A | * | 10/2005 |

OTHER PUBLICATIONS

International Search Report issued on Jul. 14, 2009 in corresponding PCT Application No. PCT/JP2009/002296.
International Preliminary Report on Patentability, Form PCT/IB/326, dated Dec. 29, 2010 along with English translation of International Preliminary Report on Patentability, Form PCT/IB/338, dated Jan. 20, 2011.

* cited by examiner

*Primary Examiner* — Mehrdad Dastouri
*Assistant Examiner* — James M Anderson, II

(57) ABSTRACT

A microscope apparatus includes a monitoring optical system, an imaging unit capturing an image of an observation target through the monitoring optical system to generate a plurality of images, a correction unit disposed in the optical monitoring system and correcting various aberrations which occur due to an observation condition, and a decision unit deciding a correction amount of the correction unit based on the plurality of images generated by the imaging unit, whereby an image deterioration ascribable to the aberration occurring due to the observation condition in the microscope apparatus is appropriately and easily corrected according to a use condition of the microscope apparatus.

8 Claims, 11 Drawing Sheets

MICROSCOPE APPARATUS AND STORAGE MEDIUM STORING MICROSCOPE APPARATUS CONTROL PROGRAM

CROSS REFERENCE TO RELATED APPLICATION

This application is a continuation application of International Application PCT/JP2009/002296, filed May 25, 2009, designating the U.S., and claims the benefit of priority from Japanese Patent Application No. 2008-158033, filed on Jun. 17, 2008, the entire contents of which are incorporated herein by reference.

BACKGROUND

1. Field

The present application relates to a microscope apparatus including a monitoring optical system and to a storage medium storing a microscope apparatus control program for causing a computer to realize a control over the microscope apparatus.

2. Description of the Related Art

In recent years, in an observation apparatus such as a microscope, the acquisition of high-resolution images by using a high NA objective lens has become active. In order to thus acquire the high-resolution image, it is required to obtain an image without deterioration of image quality ascribable to aberration that occurs due to an observation condition such as the thickness of a cover glass and a change in refractive index of an immersion liquid due to its temperature dependency.

Therefore, in an invention of Japanese Unexamined Patent Application Publication No. 2005-31507, based on the distance between a sample being an observation target disposed in a microscope and an objective lens that the microscope has, a correction amount for optical aberration ascribable to the thickness of a cover glass protecting the sample or ascribable to the thickness of a holding member such as a transmissive petri dish holding the sample is decided, and according to the decided correction amount, a rotation angle of a correction collar is decided, whereby the aberration is corrected.

However, in the invention of the above Japanese Unexamined Patent Application Publication No. 2005-31507, since a change in refractive index of an immersion liquid due to its temperature dependency and the like are not taken into consideration, the decided correction amount is not sometimes appropriate.

SUMMARY

The present application has been developed in consideration of the above-mentioned circumstances, and a proposition thereof is to appropriately and easily correct aberration that occurs in the observation by a microscope apparatus due to an observation condition, according to a use condition of the microscope apparatus.

A microscope apparatus according to an aspect of embodiment includes a monitoring optical system, an imaging unit capturing an image of an observation target through the monitoring optical system to generate a plurality of images, a correction unit correcting various aberrations which occur due to an observation condition, and a decision unit deciding a correction amount of the correction unit based on the plurality of images generated by the imaging unit.

The decision unit may perform an analysis of a symmetry of an intensity distribution along an optical axis of the monitoring optical system by moving a focusing position based on the plurality of images and decides the correction amount according to a result of the analysis.

Further, a changing unit changing the focusing position along the optical axis of the monitoring optical system may be provided, and the decision unit may decide the correction amount based on the plurality of images being generated by the imaging unit in a state where the focusing position is different.

Further, the decision unit may generate an image of a cross section which is generated in a direction parallel to the optical axis from the plurality of images captured by the imaging unit as moving the focusing position step by step by the changing unit, perform an analysis of the symmetry of the intensity distribution along the optical axis based on the image of the cross section being generated, and decide the correction amount according to a result of the analysis.

Further, the decision unit may decide the correction amount based on the plurality of images being generated by the imaging unit in a state where the aberrations corrected by the correction unit are different.

Further, the monitoring optical system may include an objective lens having a correction collar, and the correction unit may correct the aberrations by controlling a rotation angle of the correction collar, and the decision unit may decide the rotation angle as the correction amount.

Further, the monitoring optical system may include an adaptive optics element, the correction unit may correct the aberrations by controlling the adaptive optics element, and the decision unit may decide a control amount of the adaptive optics element as the correction amount.

Further, a recording unit recording, in advance, a correspondence relation being appropriate between a comparison result of the plurality of images and the correction amount may be provided, and the decision unit may decide the correction amount based on the correspondence relation.

Further, the correcting unit may correct the aberrations based on the correction amount decided in the decision unit.

Note that a mode in which the structure of the above-described embodiment is converted to and embodied as a storage medium storing a microscope apparatus control program for causing a computer to realize a control over a microscope apparatus is also effective as a concrete mode of the present application.

DETAILED DESCRIPTION OF THE EMBODIMENTS

First Embodiment

Figure 1:
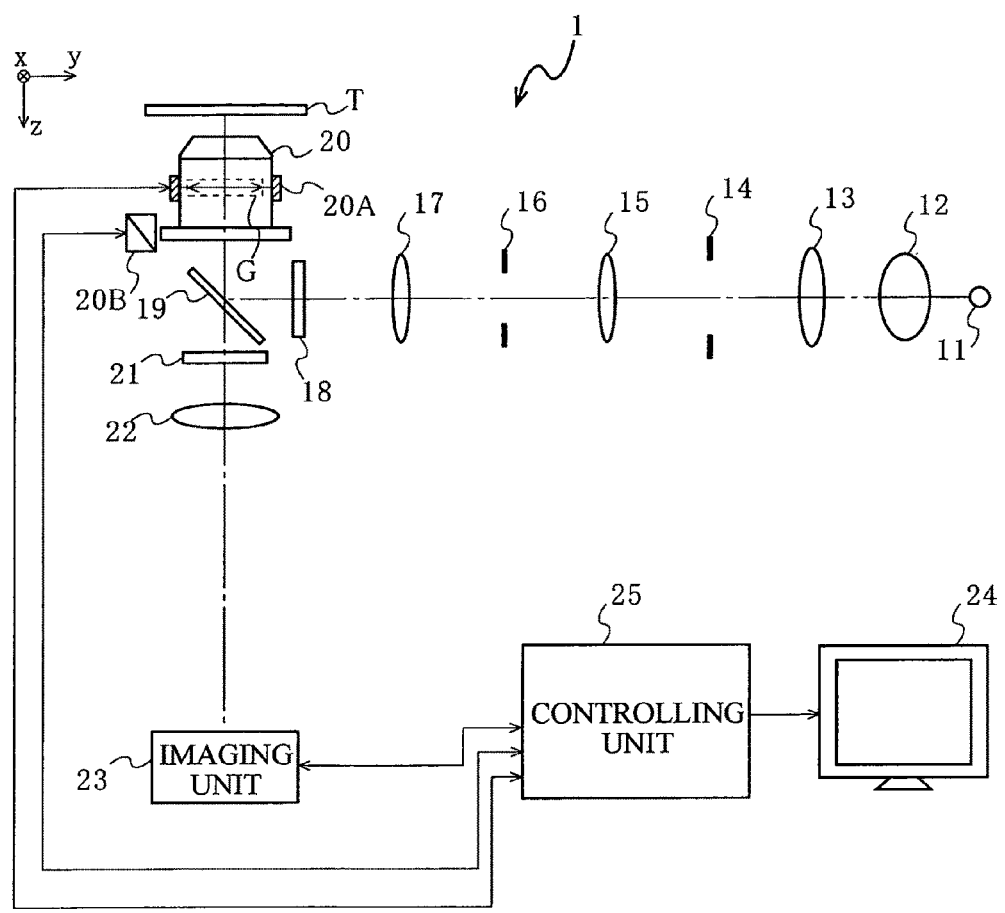
FIG. 1 is a view showing the structure of a microscope apparatus 1 of a first embodiment.

Hereinafter, a first embodiment will be described by using the drawings. FIG. 1 is a view illustrating the structure of a microscope apparatus 1 of the first embodiment.

As illustrated in FIG. 1, the microscope apparatus 1 includes components such as a light source 11, a collecting lens 12, a first relay lens 13, an aperture diaphragm 14, a second relay lens 15, a field diaphragm 16, a field lens 17, an excitation filter 18, a dichroic mirror 19, an objective lens 20, a barrier filter 21, and a second objective lens 22. The aperture diaphragm 14 is disposed near a position where a light source image is formed by the collecting lens 12 and the first relay lens 13. Further, the field diaphragm 16 is disposed at a position near a conjugate point of a front focal point of the collecting lens 12, which is formed by the second relay lens 15.

A pencil of light emitted from the light source 11 passes through the collecting lens 12, the first relay lens 13, the aperture diaphragm 14, the second relay lens 15, and the field diaphragm 16 in sequence, is converted to collimated light by the field lens 17, and enters the excitation filter 18. Then, the pencil of light undergoing wavelength selection in the excitation filter 18 undergoes wavelength selection/reflection in the dichroic mirror 19 to enter the objective lens 20. The pencil of light entering the objective lens 20 illuminates a specimen T. The specimen T is, for example, a specimen dyed with a generally known fluorescent reagent. In the specimen T, the reagent is partially excited according to the intensity and a radiation zone of the excitation light (illumination light) to emit fluorescent light. The fluorescent light emitted from the specimen T is gathered by the objective lens 20 to filter through the dichroic mirror 19 and the barrier filter 21 in sequence. Then, the pencil of light that has filtered through the barrier filter 21 is formed as an image by the second objective lens 22 and the image is formed on an imaging plane of a later-described imaging unit.

The objective lens 20 includes a correction collar 20A and a PZT driving unit 20B.

Figure 2A:
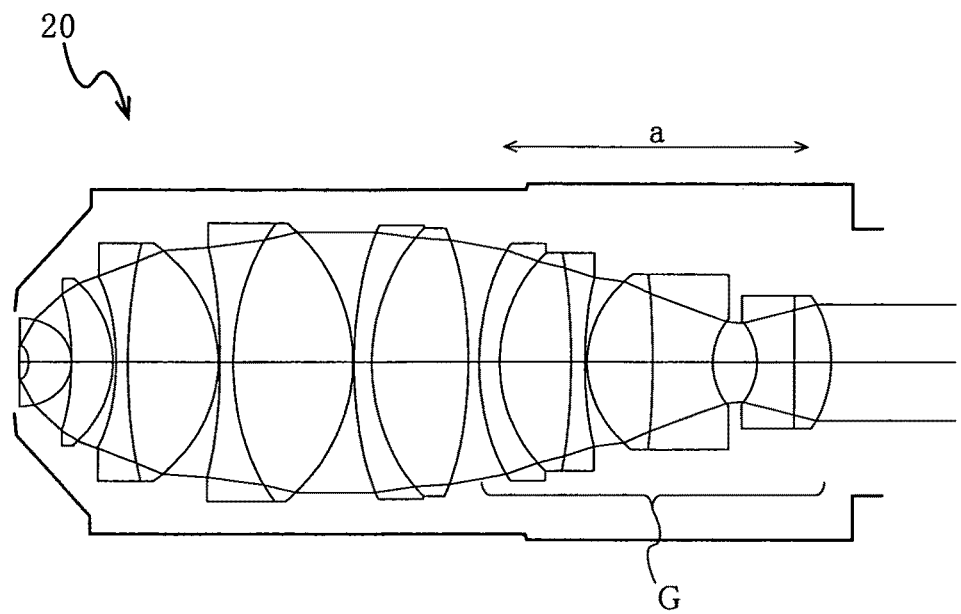
FIG. 2A is an internal sectional view of an objective lens 20.

FIG. 2A is an internal sectional view of the objective lens 20. The objective lens 20 has a plurality of lens groups as illustrated in FIG. 2A, and by moving a lens system of a correction group G among the plural lens groups in a direction of an arrow a, it is possible to correct aberration ascribable to a cover glass fixing the specimen T, a temperature-dependent change in refractive index of an immersion liquid and the like.

Figure 2B:
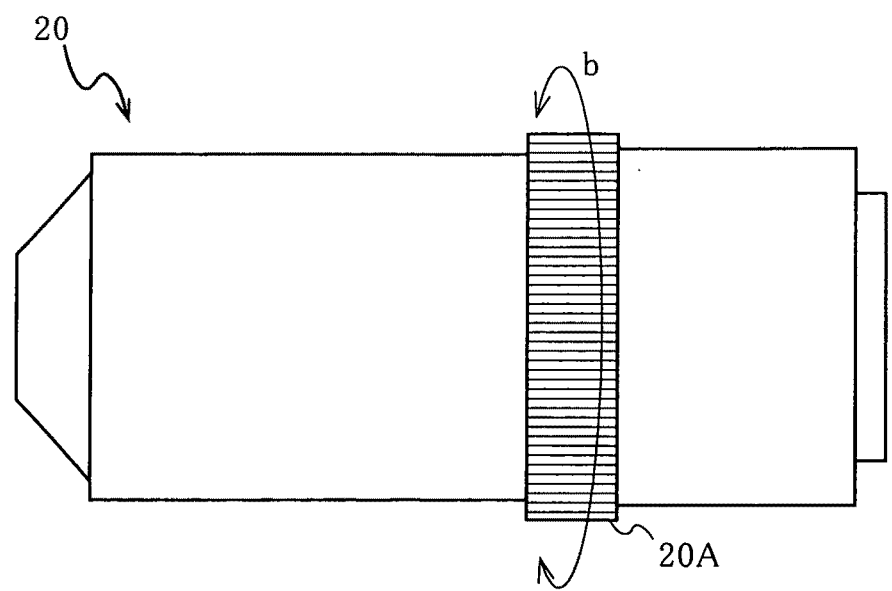
FIG. 2B is an exterior view of the objective lens 20.

FIG. 2B is an exterior view of the objective lens 20. A user can also manually move the aforesaid correction group G by rotating the correction collar 20A in a direction of an arrow b. Further, the PZT driving unit 20B is a driving unit for accurately driving all or part of the lens systems included in the objective lens 10 in an optical axis direction (z direction).

In addition to the above-described structures, the microscope apparatus 1 further includes units, that is, an imaging unit 23, a display unit 24, and a controlling unit 25. The imaging unit 23 includes a not-shown image sensor and captures an image of the specimen T to generate an image. Further, the display unit 24 includes a not-shown a display element and displays images, a menu, and so on. The controlling unit 25 is a computer or the like and centrally controls the parts of the microscope apparatus 1. The controlling unit 25 is coupled to the correction collar 20A, the PZT driving unit 20B, and the imaging unit 23 and is capable of automatically controlling these parts. Further, an output of the controlling unit 25 is also coupled to the display unit 24.

Figure 3:
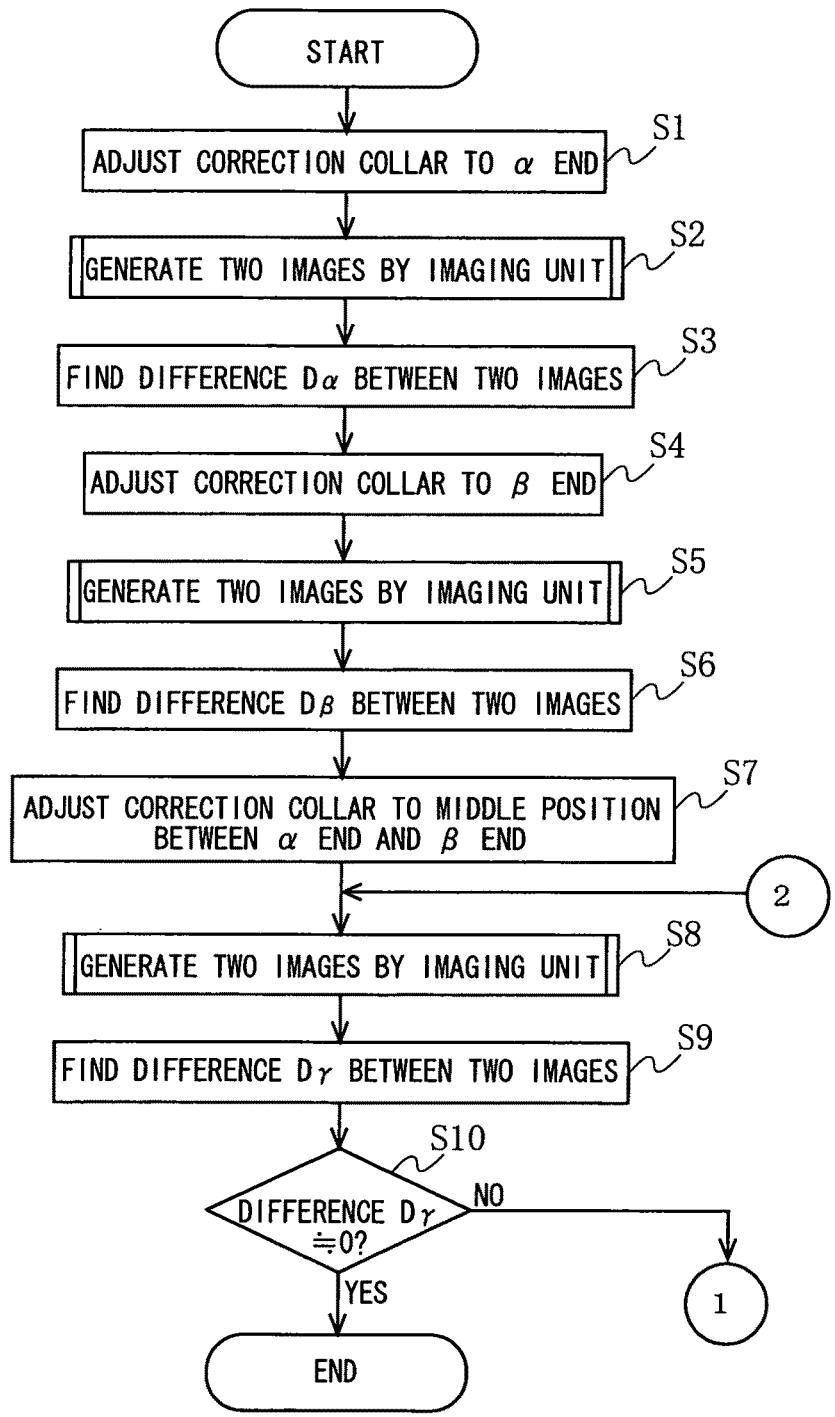
FIG. 3 is a flowchart illustrating the operation of a controlling unit 25 when it automatically controls a correction collar 20A, in the microscope apparatus 1 of the first embodiment.
Figure 4:
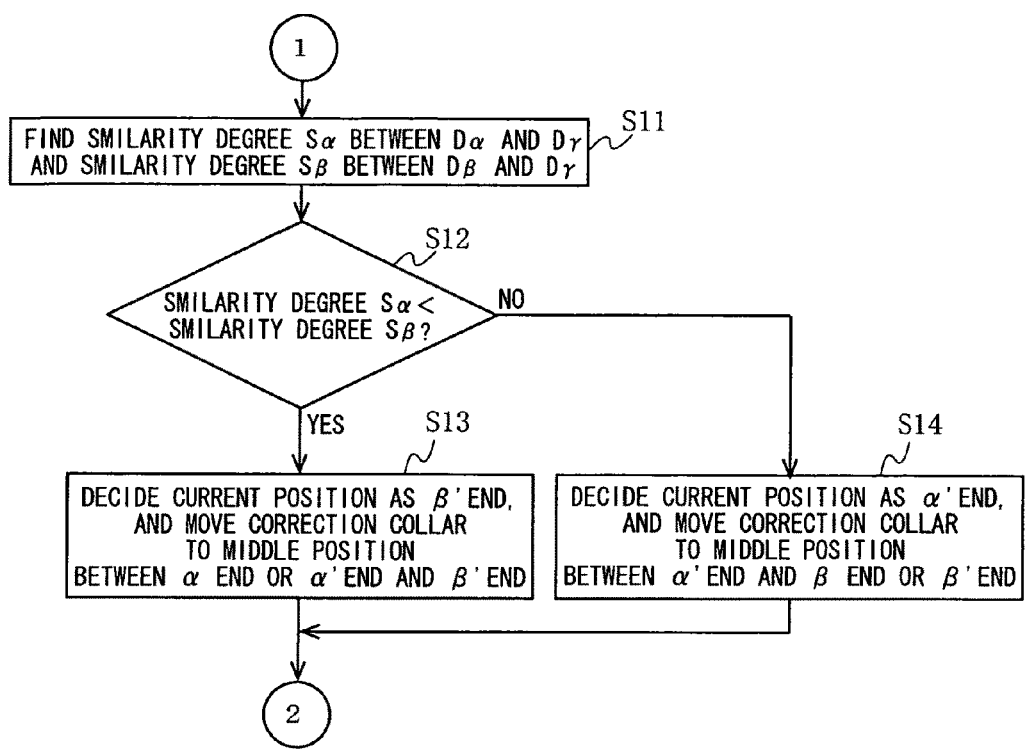
FIG. 4 is a flowchart illustrating the operation of the controlling unit 25 when it automatically controls the correction collar 20A, in the microscope apparatus 1 of the first embodiment (continued).
Figure 5:
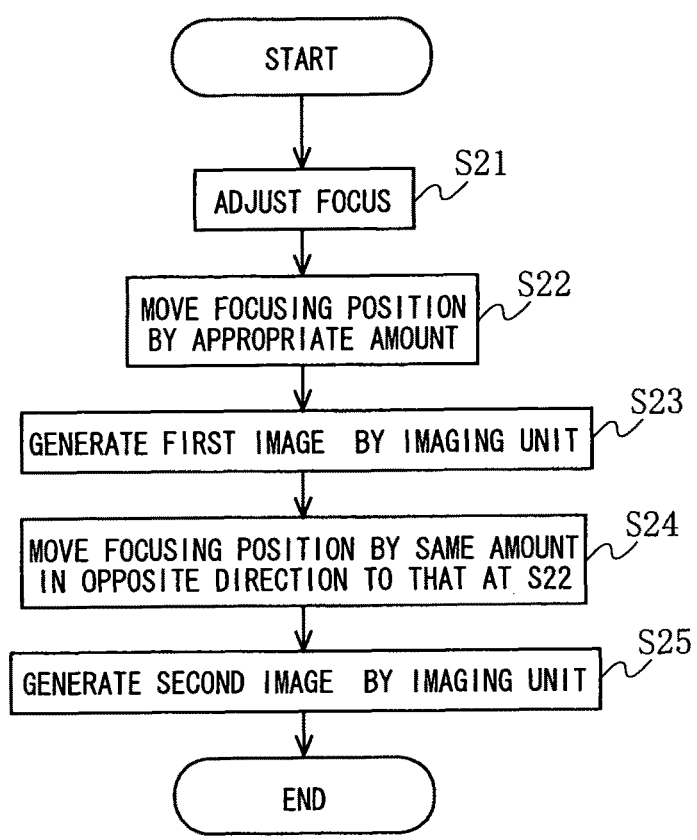
FIG. 5 is a flowchart illustrating the operation of the controlling unit 25 when it automatically controls the correction collar 20A, in the microscope apparatus 1 of the first embodiment (continued).

In the microscope apparatus 1 as structured above, the operation of the controlling unit 25 when it automatically controls the correction collar 20A will be described by using the flowcharts in FIG. 3 to FIG. 5.

At Step S1, the controlling unit 25 controls the correction collar 20A of the objective lens 20 to adjust the correction collar 20A to an α end. The α end is one end of a span of adjustable range when the correction collar 20A is automatically controlled, and is, for example, a clockwise limit position of the correction collar 20A at the first adjustment.

At Step S2, the controlling unit 25 controls the imaging unit 23 so that the imaging unit 23 generates two images.

Here, the generation of the two images will be described in detail with reference to the flowchart in FIG. 5.

At Step S21, the controlling unit 25 controls the PZT driving unit 20B to adjust the focus. A method of the focus adjustment may be any.

At Step S22, the controlling unit 25 controls the PZT driving unit 20B by an appropriate amount to move a focusing position to an imaging unit 23 side of a focus position. Note that the appropriate amount by which the PZT driving unit 20B is controlled means an amount about equal to or double the depth of focus.

Figures 6A, 6B, 6C:
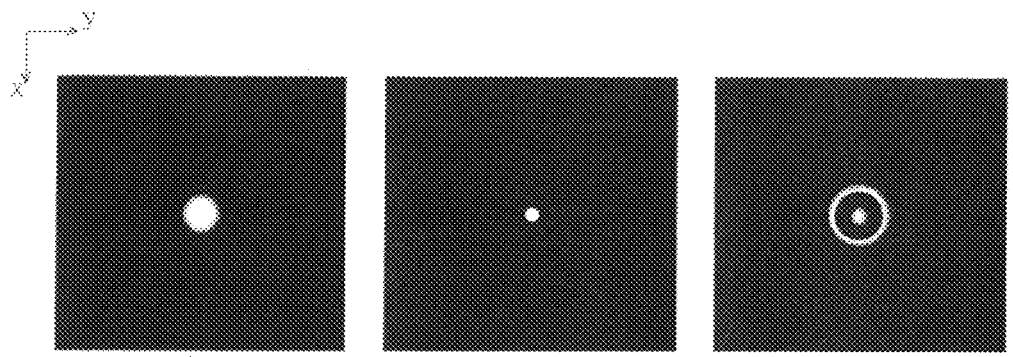
FIGS. 6A to 6F are views illustrating examples of images generated when the correction collar 20A is automatically controlled, in the microscope apparatus 1 of the first embodiment.

At Step S23, the controlling unit 25 controls the imaging unit 23 so that the imaging unit 23 generates a first image. FIG. 6A illustrates an example of the first image generated in the state where the correction collar 20A is adjusted to the α end. Note that, in the following, an attention is given to an arbitrary florescent bead in a state where fluorescent beads in the specimen T are within a field of the image sensor of the imaging unit 23, and this portion is clipped off and an image of only this clipped portion is illustrated as an example.

At Step S24, the controlling unit 25 controls the PZT driving unit 20B to move the focusing position in an opposite direction from the direction at Step S22 by the same amount as the amount by which the focusing position is moved at Step S22.

At Step S25, the controlling unit 25 controls the imaging unit 23 so that the imaging unit 23 generates the second image. FIG. 6C illustrates an example of the second image generated in the state where the correction collar 20A is adjusted to the α end. Incidentally, FIG. 6B illustrates an example of an image generated in the state where the correction collar 20A is adjusted to the α end and the focus is adjusted (the state at Step S21).

At Step S3, the controlling unit 25 finds a difference Dα between the two images generated at Step S23 and Step S25. As the difference Dα between the two images, the controlling unit 25 finds, for example, a difference between values of each pixel at the same position in the two images. Incidentally, the difference does not necessarily have to be found for all the pixels, and the difference may be found only for pixels in an attention zone including a major portion.

At Step S4, the controlling unit 25 controls the correction collar 20A of the objective lens 20 to adjust the correction collar 20A to a β end. The β end is the other end of the span of adjustable range (an end opposite the aforesaid α end) when the correction collar 20A is automatically controlled, and at the first adjustment, is an anticlockwise limit position of the correction collar 20A, for instance.

Figures 6D, 6E, 6F:
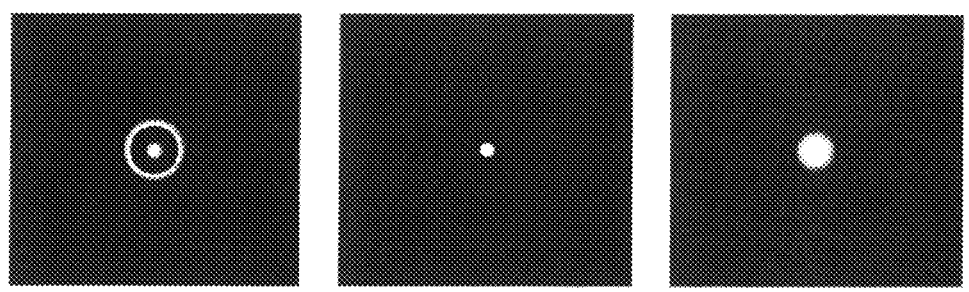

At Step S5, the controlling unit 25 controls the imaging unit 23 so that the imaging unit 23 generates two images by the same method as that used at Step S2. FIG. 6D illustrates an example of the first image generated in the state where the correction collar 20A is adjusted to the β end, and FIG. 6F illustrates an example of the second image generated in the state where the correction collar 20A is adjusted to the β end. Note that FIG. 6E illustrates an example of an image generated in the state where the correction collar 20A is adjusted to the β end and the focus is adjusted.

At Step S6, the controlling unit 25 finds a difference Dβ between the two images generated at Step S5. The controlling unit 25 finds the difference Dβ by the same method as the method used at Step S3.

At Step S7, the controlling unit 25 controls the correction collar 20A of the objective lens 20 to adjust the correction collar 20A to a middle position between the α position and the β position.

At Step S8, the controlling unit 25 controls the imaging unit 23 so that the imagining unit 23 generates two images by the same method as that used at Step S2.

At Step S9, the controlling unit 25 finds a difference Dγ between the two images generated at Step S8. The controlling unit 25 finds the difference Dγ by the same method as that used at Step S3.

At Step S10, the controlling unit 25 determines whether or not the difference found at Step S9 is Dγ≈0. Then, when determining that the difference is Dγ≈0, the controlling unit 25 ends a series of the processes. When determining that the difference is not Dγ≈0, the controlling unit 25 goes to Step S11.

At Step S11, the controlling unit 25 finds a similarity degree Sα between the difference Dα found at Step S3 and the difference Dγ found at Step S9, and also finds a similarity degree Sβ between the difference Dβ found at Step S6 and the difference Dγ found at Step S9. For example, the controlling unit 25 compares distributions of the difference Dα and the difference Dγ to find their similarity degree as the similarity degree Sα. It should be noted that targets whose similarity degree Sα is to be found do not necessarily have to be all the differences Dα and the differences Dγ, and the similarity degree Sα may be found only for the differences Dα and the differences Dγ corresponding to pixels in the attention zone including the major portion. The controlling unit 25 finds the similarity degree Sβ by the same method as well based on the difference Dβ and the difference Dγ.

At Step S12, the controlling unit 25 determines whether or not a relation between the similarity degree Sα and the similarity degree Sβ which are found at Step S11 is Sα<Sβ, and goes to Step S13 when the relation between the similarity degrees is Sα<Sβ. When the relation between the similarity degrees is not Sα<Sβ (when the relation between the similarity degrees is Sα≥Sβ), the controlling unit 25 goes to Step S14 which will be described later. The case where the relation between the similarity degrees is Sα<Sβ is a case where the difference Dγ can be regarded as more similar to the difference Dβ than to the difference Dα, and is a case where an optical-axis-direction change in the image at a current position is more similar to an optical-axis-direction change in the image at the β end than to an optical-axis-direction change in the image at the α end. On the other hand, the case where the relation between the similarity degrees is not Sα<Sβ is a case where the optical-axis-direction change in the image at the current position can be regarded as more similar to the optical-axis-direction change in the image at the α end than to the optical-axis-direction change in the image at the β position. That is, when the relation between the similarity degrees is Sα<Sβ, it can be thought that an optimum adjustment position of the correction collar 20A is on the α end side of the current position, and when the relation between the similarity degrees is not Sα<Sβ, it can be thought that the optimum adjustment position of the correction collar 20A is on the β end side of the current position.

At Step S13, the controlling unit 25 decides the current position as a β' end and moves the correction collar 20A to a middle position between the α end or α' end and the β' end. Then, the controlling unit 25 returns to Step S8 to perform the processes at and after Step S8 again.

At Step S14, the controlling unit 25 decides the current position as the α' end and moves the correction collar 20A to a middle position between the α' end and the β end or β' end. Then, the controlling unit 25 returns to Step S8 to perform the processes at and after Step S8 again.

Then, the controlling unit 25 finds the similarity degree Sα and the similarity degree Sβ based on the difference Dγ newly found at Step S9, and decides a next adjustment position based on the result of the comparison therebetween. The controlling unit 25 compares the similarity degree Sα and the similarity degree Sβ, and determines whether the optimum adjustment position of the correction collar 20A is on the α end side or on the β end side of the current position. Then, the controlling unit 25 shifts an adjustment range in a direction of the determined end to decide a next adjustment range.

Figure 7:
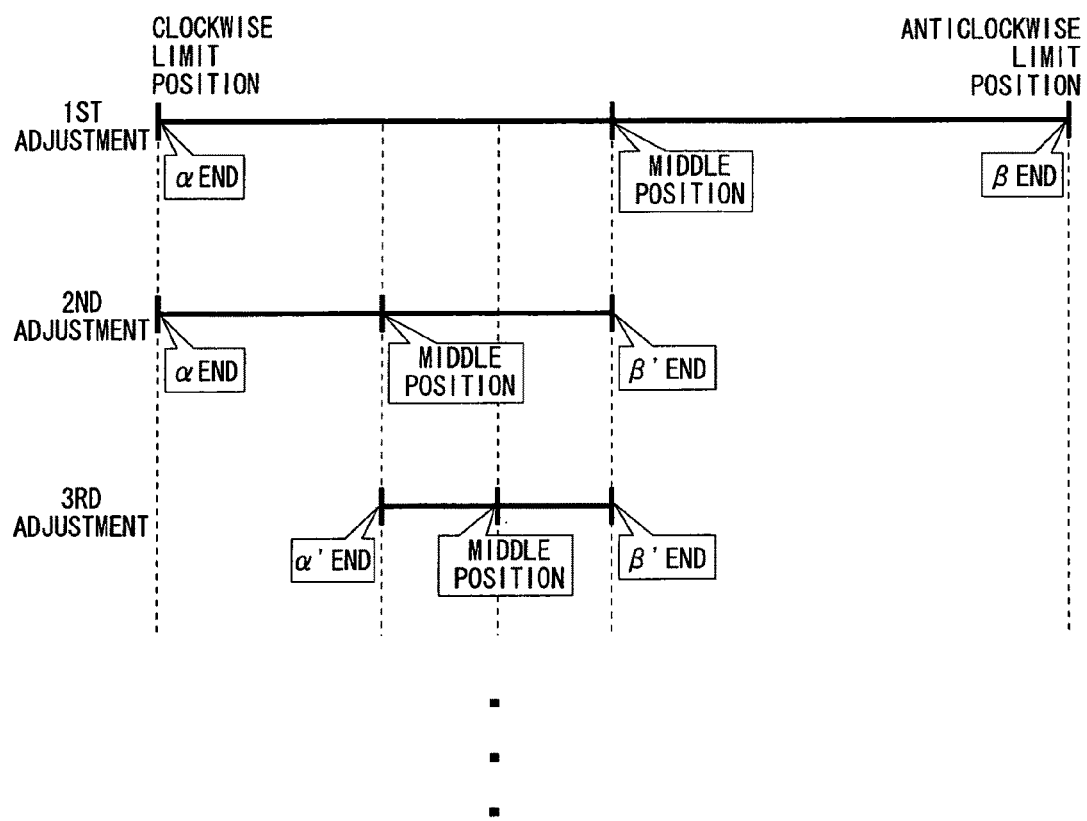
FIG. 7 is an explanatory chart of the automatic control over the correction collar 20A in the microscope apparatus 1 of the first embodiment.

For example, if, as a result of the comparison between the similarity degree Sα and the similarity degree Sβ in the first processing, it is determined that the optimum adjustment position of the correction collar 20A is on the α end side of the middle position, the current position is decided as the β' end as illustrated in FIG. 7. Then, if, as a result of the same comparison between the similarity degree Sα and the similarity degree Sβ in the second processing, it is determined that the optimum adjustment position of the correction collar 20A is on the β' end side of the middle position, the current position is decided as the α' end as illustrated in FIG. 7. By repeating such processes (Step S1 to Step S14) until the difference is determined as Dγ≈0 (YES at Step S10), the controlling unit 25 is capable of finding the optimum adjustment position of the correction collar 20A.

When the adjustment range comes to converge as a result of the repetition of the processes a plurality of times, blur of the image becomes small, which sometimes makes the determination difficult. In this case, the control amount of the PZT driving unit 20B which is set equal to or double the depth of focus previously may be adjusted to a narrow range. This range may be gradually narrowed or may be narrowed in stages.

As described above, according to the first embodiment, there are included the monitoring optical system; the imaging unit capturing an image of an observation target that is set across the monitoring optical system to generate an image; and the correcting unit disposed in the monitoring optical system and correcting aberration occurring due to the observation condition, and based on the plural images generated by the imaging unit, the correction amount used by the correcting unit, that is, an appropriate position of the correcting unit in the monitoring optical system is decided. Then, based on the decided correction amount, the aberration is corrected by the correcting unit. Therefore, aberration which occurs in the microscope apparatus due to the observation condition such as the thickness of the cover glass and a temperature-dependent change in refractive index of the immersion liquid can be appropriately and easily corrected according to the use condition of the microscope apparatus. In particular, according to the first embodiment, even when the observation target is one having a thickness in the optical axis of the objective lens, such as an organism cell, optical can be appropriately and easily corrected according to the use condition of the microscope apparatus.

Further, according to the first embodiment, based on the plural images, the symmetry in terms of the intensity distribute along the optical axis of the monitoring optical system is analyzed in a focusing position, and according to the analysis result, the correction amount is decided. Therefore, it is possible to decide an appropriate correction amount without being influenced by factors such as a change in refractive index of the immersion liquid due to its temperature dependency.

Further, according to the first embodiment, the changing unit changing the focusing position in the optical axis of the monitoring optical system is provided, and based on the plural images that the imaging unit generates in the state where different positions are set as the focusing position, the correction amount is decided. Therefore, by making use of the structure included in the microscope apparatus, it is possible to generate images suitably used in deciding an appropriate correction amount.

Second Embodiment

Hereinafter, a second embodiment will be described by using the drawings. Since the second embodiment is a modification example of the first embodiment, only what are different from the first embodiment will be described.

The structure of a microscope apparatus of the second embodiment is the same as that of the microscope apparatus 1 of the first embodiment. Therefore, in the following description, the same reference numerals and symbols as those of the first embodiment will be used.

Figure 8:
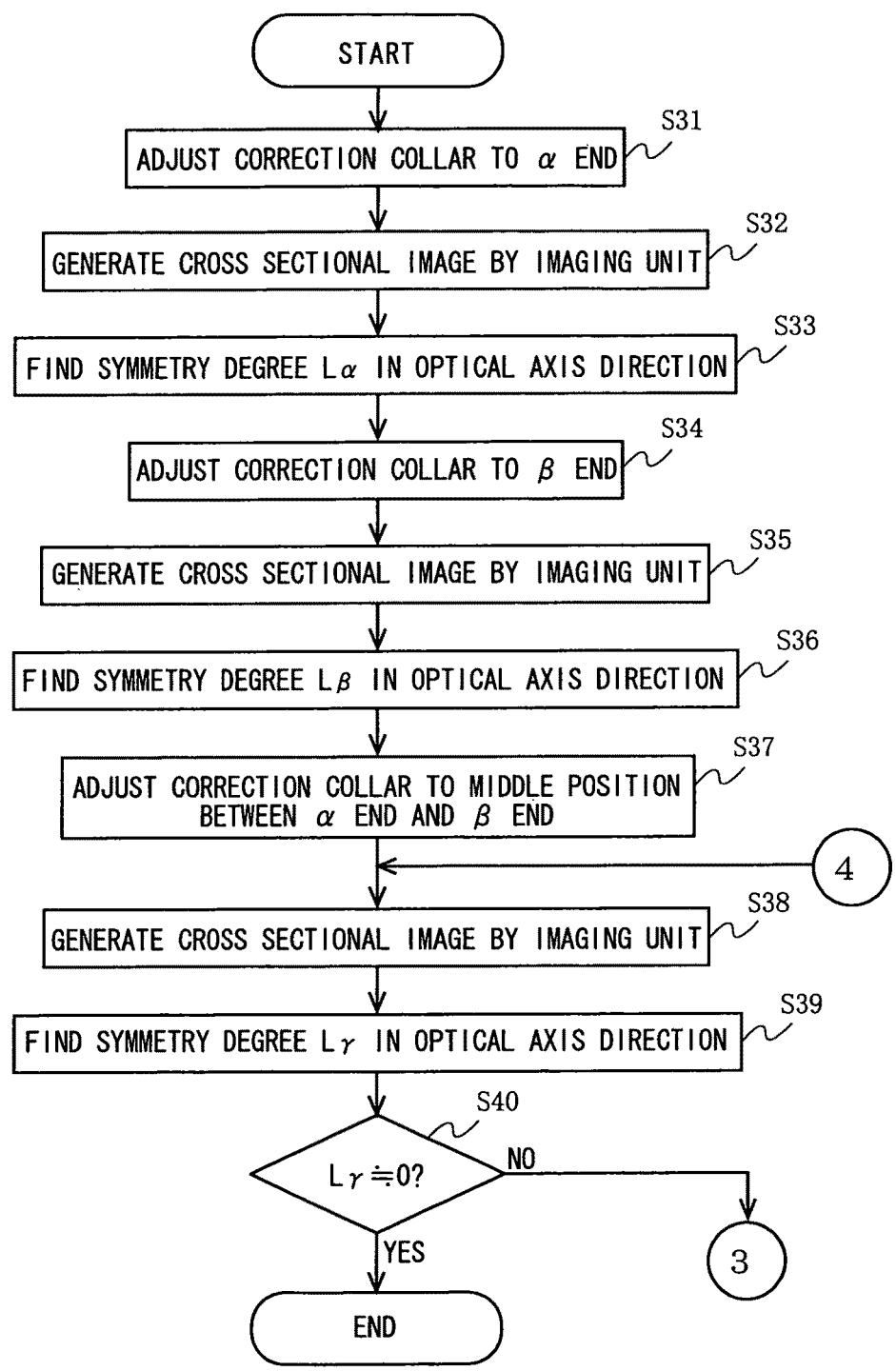
FIG. 8 is a flowchart illustrating the operation of a controlling unit 25 when it automatically controls a correction collar 20A, in a microscope apparatus 1 of a second embodiment.
Figure 9:
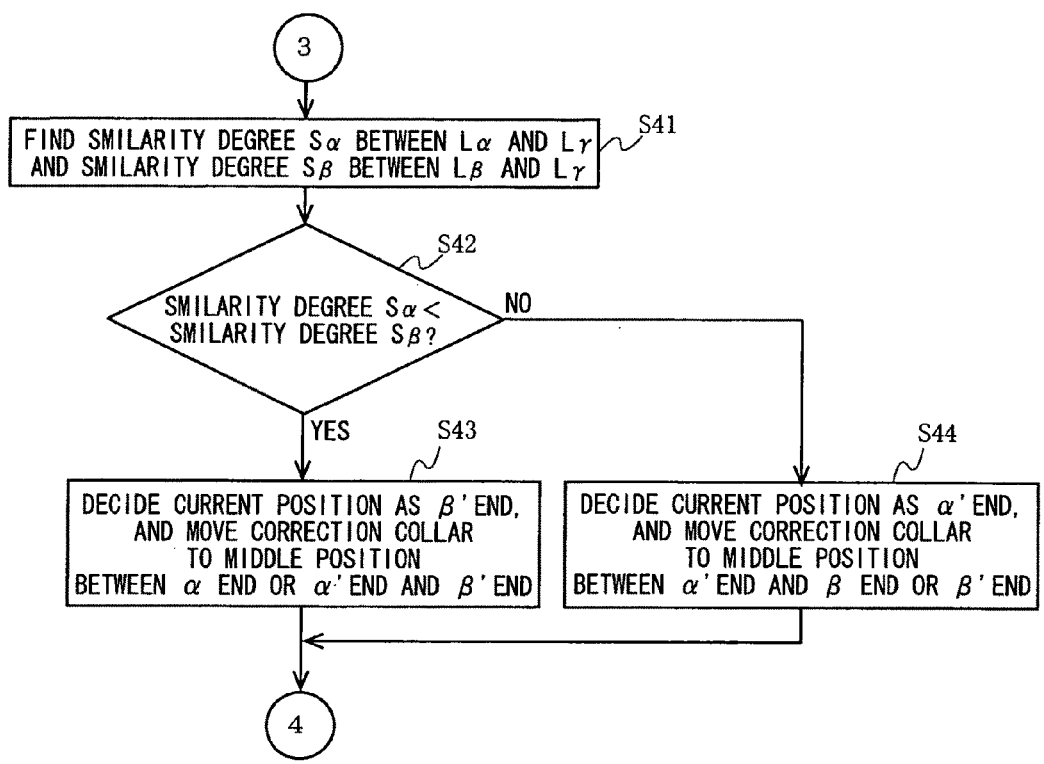
FIG. 9 is a flowchart illustrating the operation of the controlling unit 25 when it automatically controls the correction collar 20A, in the microscope apparatus 1 of the second embodiment (continued).

The flowcharts in FIG. 8 and FIG. 9 illustrate the operation of a controlling unit 25 when it automatically controls a correction collar 20A, in the microscope apparatus 1 of the second embodiment.

At Step S31, the controlling unit 25 controls the correction collar 20A of an objective lens 20 to adjust the correction collar 20A to an α end by the same method as that used at Step S1 of the first embodiment.

Figure 10:
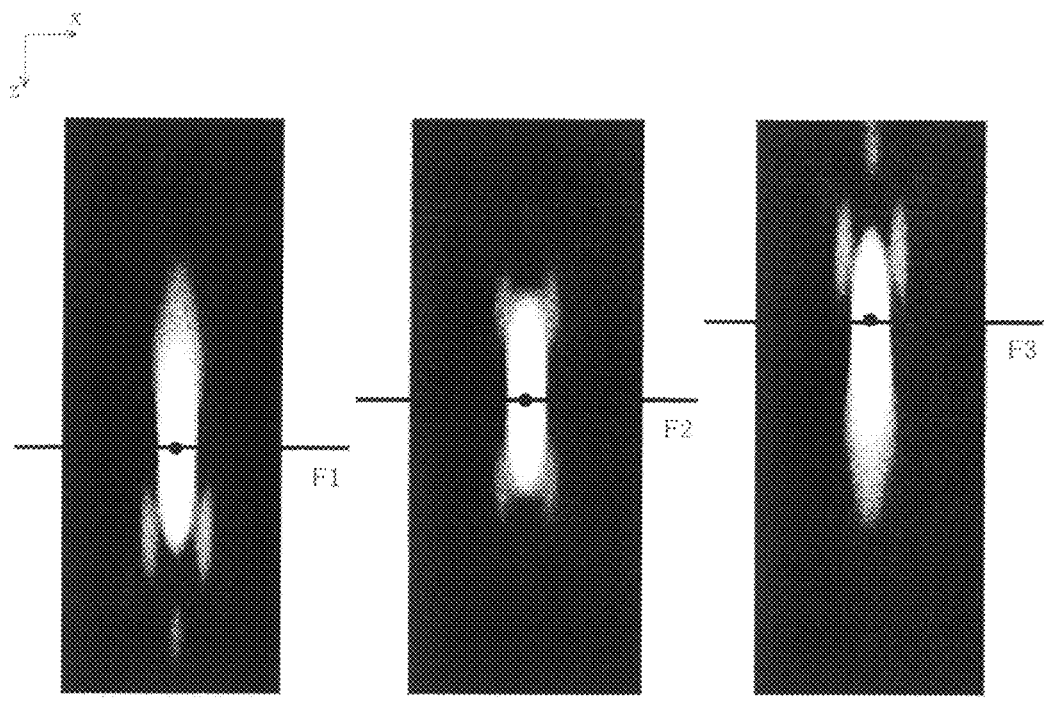
FIG. 10A is a view illustrating an image generated when the correction collar 20A is automatically controlled, in the microscope apparatus 1 of the second embodiment.
FIG. 10B is a view illustrating an image generated when the correction collar 20A is automatically controlled, in the microscope apparatus 1 of the second embodiment.
FIG. 10C is a view illustrating an image generated when the correction collar 20A is automatically controlled, in the microscope apparatus 1 of the second embodiment.

At Step S32, the controlling unit 25 controls an imaging unit 23 so that the imaging unit 32 generates a cross sectional image. For the generation of the cross sectional image, the controlling unit 25 controls the PZT driving unit 20B to adjust a width equal to a predetermined multiple of the depth of focus at small intervals by step-driving, and every time the focusing position is changed, the controlling unit 25 controls the imaging unit 23 so that the imagining unit 23 generates an image. Then, the controlling unit 25 forms a 3D image from the plural generated images by the same method as that of a generally known art, and generates the image of the cross section taken along an x-z plane. FIG. 10A to FIG. 10C illustrate examples of the cross sectional images.

At Step S33, the controlling unit 25 finds a symmetry degree Lα of the cross sectional image generated at Step S32 in terms of an optical axis direction. For example, the controlling unit 25 folds the cross sectional image along an x-direction straight line passing through a point whose intensity is the largest, in the cross sectional image, and finds the symmetry degree between corresponding pixels to decide this as the symmetry degree Lα. Incidentally, the symmetry degree does not necessarily have to be found for all the pixels, and the symmetry degree Lα may be found only for pixels in an attention zone including a major portion.

At Step S34, the controlling unit 25 controls the correction collar 20A of the objective lens 20 to adjust the correction collar 20A to a β end by the same method as that used at Step S4 of the first embodiment.

At Step S35, the controlling unit 25 controls the imaging unit 23 so that the imaging unit 23 generates a cross sectional image by the same method as that used at Step S32.

At Step S36, the controlling unit 25 finds a symmetry degree Lβ of the cross sectional image generated at Step S35 in terms of the optical axis direction. The controlling unit 25 finds the symmetry degree Lβ by the same method as that used at Step S33.

At Step S37, the controlling unit 25 controls the correction collar 20A of the objective lens 20 to adjust the correction collar 20A to a middle position between the α end and the β end by the same method as that used at Step S7 of the first embodiment.

At Step S38, the controlling unit 25 controls the imaging unit 23 so that the imagining unit 23 generates a cross sectional image by the same method as that used at Step S32.

At Step S39, the controlling unit 25 finds a symmetry degree Lγ of the cross sectional image generated at Step S38 in terms of the optical axis direction. The controlling unit 25 finds the symmetry degree Lγ by the same method as that used at Step S33.

At Step S40, the controlling unit 25 determines whether or not the symmetry degree Lγ found at Step S39 is Lγ≈0. Then, when determining that the symmetry degree is Lγ≈0, the controlling unit 25 ends a series of the processes. On the other hand, when determining that the symmetry degree is not Lγ≈0, the controlling unit 25 goes to Step S41.

At Step S41, the controlling unit 25 finds a similarity degree Sα between the symmetry degree Lα found at Step S33 and the symmetry degree Lγ found at Step S39, and also finds a similarity degree Sβ between the symmetry degree Lβ found at Step S36 and the symmetry degree Lγ found at Step S39 by the same method as that used at Step S11 of the first embodiment.

At Step S42 to Step S44, the controlling unit 25 performs the same processes as those of Step S12 to Step S14 of the first embodiment.

FIG. 10B illustrates an example of the cross sectional image in a state where the correction collar 20A is adjusted to the optimum adjustment position and the aberration is corrected. Further, FIG. 10A and FIG. 10C illustrate examples of the cross sectional images in a state where the correction collar 20A is adjusted to deviate from the optimum adjustment position and the aberration is remaining. It is seen that in the example in FIG. 10B, the intensity distribution is substantially symmetrical with respect to a fold line F2 (x-direction straight line passing through the point with the largest intensity). It is further seen that in the examples in FIG. 10A and FIG. 10C, the intensity distribution is asymmetrical with respect to fold lines F1 and F3.

As described above, according to the second embodiment, based on the plural images, the image of the cross section taken along the direction parallel to the optical axis is created, and based on the created cross sectional image, the symmetry in terms of the intensity distribution along the optical axis is analyzed, and according to the analysis result, the correction amount is decided. Therefore, the same effect as that of the first embodiment can be obtained.

Third Embodiment

Hereinafter, a third embodiment will be described. Since the third embodiment is a modification example of the first embodiment and the second embodiment, only what are different from the first embodiment and the second embodiment will be described.

The structure of a microscope apparatus of the third embodiment is the same as that of the microscope apparatus 1 of the first embodiment and the second embodiment. Therefore, the same reference numerals and symbols as those of the first embodiment will be used in the description below.

In the microscope apparatus 1 of the third embodiment, a table showing a correspondence relation between adjustment positions of a correction collar 20A and images obtained in these states is recoded in advance in a not-shown memory in a controlling unit 25. The images recorded in the table may be the images described in the first embodiment (images in FIG. 6A to FIG. 6F), or may be the cross sectional images described in the second embodiment (images in FIG. 10A to FIG. 10C). Alternatively, instead of the images, the difference Dα and the difference Dβ of the first embodiment or the symmetry degree Lα and the symmetry degree Lβ of the second embodiment may be recorded.

Then, the controlling unit 25 generates an image by the same method as that used in the first embodiment or the second embodiment, and by collating the generated image with this table, it can estimate an optimum adjustment position of the correction collar 20A. Incidentally, this table is preferably prepared based on a supposed use condition under which the microscope apparatus 1 is used (especially temperature, and in addition, humidity, brightness, and the like). Since a microscope apparatus is generally used in a laboratory or the like having an environment adjusted to a predetermined condition, it is easy to suppose the use condition in advance.

As described above, according to the third embodiment, the appropriate correspondence relation between the comparison result of the plural images and the correction amount is recorded in advance, and based on the recorded correspondence relation, the correction amount is decided. Therefore, by a simple process of collating with the table, it is possible to obtain the same effect as that of the first embodiment.

In the first embodiment to the third embodiment, the structure including the correction collar 20A that a user can manually operate is taken as an example in the description, but a structure in which the correction collar 20A is not provided and the lenses of the correction group G (refer to FIG. 2A) are automatically controllable only by the controlling unit 25 may be adopted.

Fourth Embodiment

Hereinafter, a fourth embodiment will be described by using the drawings. Since the fourth embodiment is a modification example of the first embodiment to the third embodiment, only what are different from the first embodiment to the third embodiment will be described.

Figure 11:
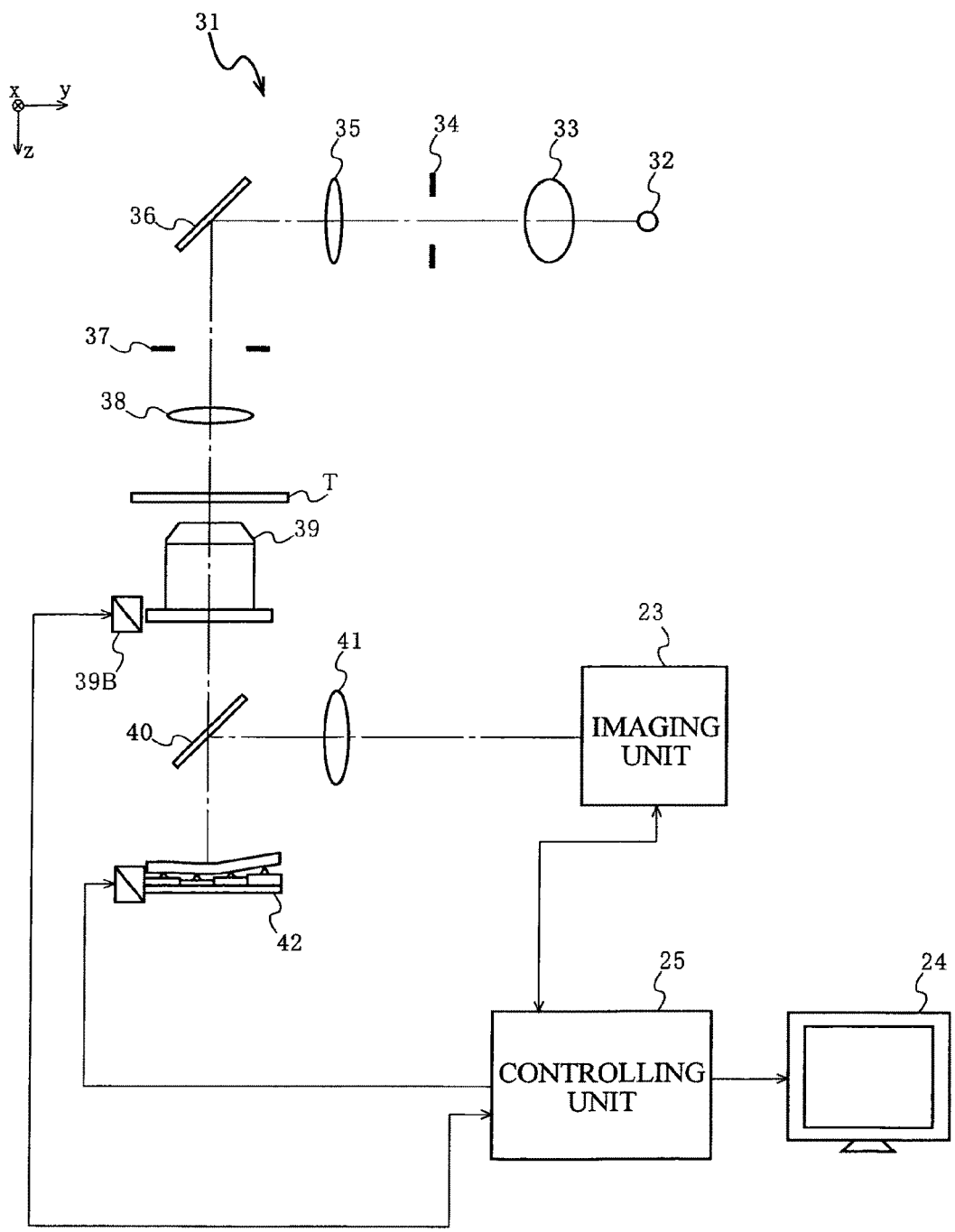
FIG. 11 is a view illustrating the structure of a microscope apparatus 31 of a fourth embodiment.

FIG. 11 is a view illustrating the structure of a microscope apparatus 31 of the third embodiment. As illustrated in FIG. 11, the microscope apparatus 31 includes components such as a light source 32, a collecting lens 33, a field diaphragm 34, a field lens 35, a fold-up mirror 36, an aperture diaphragm 37, a condenser lens 38, an objective lens 39, a half mirror 40, a second objective lens 41, and a deformable mirror 42. The field diaphragm 34 is disposed near a conjugate point of a rear focal point of the collecting lens 33. Further, the aperture diaphragm 37 is disposed at a position near a front focal point of the condenser lens 38.

A pencil of light emitted from the light source 32 is converted to collimated light by the collecting lens 33. Then, an image of the field diaphragm 34 passes through the field lens 35 and the fold-up mirror 36 to be converted to a pencil of light directed downward in a z direction and thereafter passes through the aperture diaphragm 37 to be projected onto a specimen T by the condenser lens 38. A pencil of light from the specimen T is gathered by the objective lens 39 and thereafter filters through the half mirror 40 to enter the deformable mirror 42 as image forming light. The deformable mirror 42 is a reflective wavefront converting element that is deformable into any shape by controlling an actuator on its rear surface. The pencil of light subjected to the wavefront conversion and reflected by the deformable mirror 42 is reflected by the half mirror 40 and thereafter is formed as an image by the second objective lens 41 and the image is formed on an imaging plane of a later-described imaging unit.

Note that the objective lens 39 includes the same PZT driving unit 39B as that of the first embodiment but does not include the correction collar of the first embodiment.

In addition to the above-described structures, the microscope apparatus 31 further includes the same units as those of the first embodiment, that is, an imaging unit 23, a display unit 24, and a controlling unit 25. However, the controlling unit 25 not only is coupled to the PZT driving unit 39B and the imaging unit 23 similarly to that of the first embodiment but also is coupled to the deformable mirror 42, and is capable of automatically controlling these parts.

In the microscope apparatus 31 as structured above, the controlling unit 25 controls the deformable mirror 42 instead of automatically controlling the correction collar 20A as in the first embodiment and the third embodiment. A concrete controlling method is the same as that of the first embodiment to the third embodiment. That is, the controlling unit 25 is capable of finding an optimum adjustment shape of the deformable mirror 42 by performing the same processes as those of the first embodiment to the third embodiment, with the adjustment range of the correction collar 20A (from the clockwise limit position to the anticlockwise limit position) being replaced by an adjustable range of the shape of the deformable mirror 42.

As described above, according to the fourth embodiment, the monitoring optical system includes the wavefront converting element, and controlling the wavefront converting element enables the aberration correction. Then, as an aberration correction amount, a control amount of the wavefront converting element is decided. Therefore, the same effect as that of the first embodiment can be obtained.

The fourth embodiment gives the example where the deformable mirror 42 being the wavefront converting element is provided outside the objective lens 39, but a member or the like corresponding to the wavefront converting element may be provided inside the objective lens 39. For example, the wavefront converting element may be provided on a surface of some lens of the lens group that the objective lens 39 has, or a special-purpose lens (for example, a liquid lens or the like) whose lens characteristic is changeable may be provided on part of the lens group that the objective lens 39 has.

Part of the processes described in the above embodiments may be performed based on a manual operation of a user. For example, a guide helping a user manually perform the processes described in the above embodiments may be displayed on the display unit 24. In this case, messages prompting a user's operation such as "please adjust the correction collar to the α end", "please adjust the focus", and the like may be displayed in sequence on the display unit 24. Such display enables a user to perform an operation according to the guide to appropriately adjust the correction collar 20A or the deformable mirror 42.

Another possible structure may be to automatically perform only the image generation (Steps S2, S5, S8 of the first embodiment and Steps S32, S35, S38 of the second embodiment) and display the generated images on the display unit 24. In this case, a user can determine an adjustment amount of the correction collar 20A or the deformable mirror 42 while watching the images displayed on the display unit 24 with his/her eyes, and based on the determination, can perform the operation.

Another possible structure may be to automatically perform only the decision of the adjustment amount (Step S1 to Step S12 of the first embodiment and Steps S31 to Step S42 of the second embodiment) and display the decided adjustment amount on the display unit 24. In this case, a user can appropriately adjust the correction collar 20A or the deformable mirror 42 according to the adjustment amount displayed on the display unit 24.

Further, the above-described embodiments give the examples where the evaluation values (the difference Dα and the difference Dβ of the first embodiment, the symmetry degree Lα and the symmetry degree Lβ of the second embodiment, and so on) are found based on the pixel values, but the present invention is not limited to these examples. For example, PSF (Point Spread Function), MTF (Modulation Transfer Function), or the like may be used, or a property such as luminance, contrast, or resolution may be used. Further, a plurality of factors may be used in combination.

Further, in the above-described embodiments, no particular reference is made of the image sensor of the imaging unit 23, but the image sensor may be an area sensor or a line sensor provided that it is capable of obtaining the image of the specimen T being an observation target. Further, it may be a monochrome sensor or may be a color sensor. Incidentally, when the color sensor is provided as the image sensor of the imaging unit 23, it is possible to correct the aberration more subtly by making use of color information.

Further, in the description of the above embodiments, as the specimen T, the fluorescent beads dyed with the generally known fluorescent reagent are taken as an example, but the present invention is not limited to this example. For example, the specimen T may be an absorber specimen, or may be a specimen in a form other than a bead form.

Further, the structures of the microscope apparatuses described in the above embodiments are only examples and the present invention is not limited to these examples. For example, the present invention is also applicable to a microscope apparatus including a wavefront converting element other than the deformable mirror (refer to the fourth embodiment and FIG. 11). Further, the present invention is also applicable to a microscope apparatus having a structure other than those described in the above embodiments and to a microscope apparatus having a microscopic examination method other than those described in the above embodiments.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A microscope apparatus comprising:
   a monitoring optical system including an objective lens;
   a setting unit setting a focal position such that a focus of the objective lens is on an observation target;
   a changing unit changing the focal position set by the setting unit along an optical axis of the monitoring optical system;
   an imaging unit capturing an image of the observation target generated in the monitoring optical system to generate an image in a first state in which the focal position is moved by the changing unit by a first distance in a first direction, and capturing an image of the observation target generated in the monitoring optical system to generate an image in a second state in which the focal position is moved by the changing unit by the first distance in a second direction, the second direction being opposite to the first direction;
   a correction collar correcting aberration that occurs when the focus of the objective lens is positioned at the observation target: and
   an adjusting unit adjusting a rotation position of the correction collar, wherein the adjusting unit
   (i) calculates a difference of an image intensity distribution between a first area of the image generated in the first state and a second area of the image generated in the second state as a first difference when the rotation position of the correction collar is at a first rotation position, in which positions on the image of the first area and the second area correspond,
   (ii) calculates a difference of an image intensity distribution between the first area of the image generated in the first state and the second area of the image generated in the second state as a second difference when the rotation position of the correction collar is at a second rotation position,
   (iii) calculates a difference of an image intensity distribution between the first area of the image generated in the first state and the second area of the image generated in the second state as a third difference when the rotation position of the correction collar is at a third rotation position that is between the first rotation position and the second rotation position, and
   resets the third rotation position to one of the first rotation position and the second rotation position based on the first difference, the second difference, and the third difference and repeats the processes (i) to (iii).

2. The microscope apparatus according to claim 1, wherein the adjusting unit
   calculates a similarity degree between the first difference and the third difference as a first similarity degree,
   calculates a similarity degree between the second difference and the third difference as a second similarity degree, and resets the third rotation position to the second rotation position when the second similarity degree is larger than the first similarity degree.

3. The microscope apparatus according to claim 1, wherein the adjusting unit calculates a similarity degree between the first difference and the third difference as a first similarity degree, calculates a similarity degree between the second difference and the third difference as a second similarity degree, and resets the third rotation position to the first rotation position when the first similarity degree is larger than the second similarity degree.

4. The microscope apparatus according to claim 1, wherein the adjusting unit sets the rotation position of the correction collar to the third rotation position and ends the processes when the third difference becomes a predetermined value.

5. A microscope apparatus comprising;

a monitoring optical system including an objective lens;

a changing unit changing a focal position of the objective lens along an optical axis of the monitoring optical system;

an imaging unit capturing an image of an observation target generated in the monitoring optical system while changing the focal position by the changing unit to generate a plurality of images;

a correction collar correcting aberration that occurs when a focus of the objective lens is positioned at the observation target; and an adjusting unit adjusting a rotation position of the correction collar, wherein the adjusting unit generates an image of a cross section in a direction parallel to the optical axis of the monitoring optical system from the plurality of images captured by the imaging unit while changing the focal position, (i) calculates a symmetry degree of intensity distribution in the optical axis of the image of the cross section as a first symmetry degree when the rotation position of the correction collar is at a first rotation position, (ii) calculates a symmetry degree of intensity distribution in the optical axis of the image of the cross section as a second symmetry degree when the rotation position of the correction collar is at a second rotation position, (iii) calculates a symmetry degree of intensity distribution in the optical axis of the image of the cross section as a third symmetry degree when the rotation position of the correction collar is at a third rotation position, and resets the third rotation position to one of the first rotation position and the second rotation position based on the first symmetry degree, the second symmetry degree, and the third symmetry degree and repeats the processes (i) to (iii).

6. The microscope apparatus according to claim 5, wherein the adjusting unit calculates a similarity degree between the first symmetry degree and the third symmetry degree as a first similarity degree, calculates a similarity degree between the second symmetry degree and the third symmetry degree as a second similarity degree, and resets the third rotation position to the second rotation position when the second similarity degree is larger than the first similarity degree.

7. The microscope apparatus according to claim 5, wherein the adjusting unit calculates a similarity degree between the first symmetry degree and the third symmetry degree as a first similarity degree, calculates a similarity degree between the second symmetry degree and the third symmetry degree as a second similarity degree, and resets the third rotation position to the first rotation position when the first similarity degree is larger than the second similarity degree.

8. The microscope apparatus according to claim 5, wherein the adjusting unit sets the rotation position of the correction collar to the third rotation position and ends the processes when the third symmetry degree becomes a predetermined value.

* * * * *